(12) United States Patent
Iacobucci

(10) Patent No.: US 11,103,100 B2
(45) Date of Patent: Aug. 31, 2021

(54) CAPPUCCINO MAKER

(71) Applicant: Iacabucci HF Aerospace S.p.A., Ferentino (IT)

(72) Inventor: Lucio Iacobucci, Ferentino (IT)

(*) Notice: Subject to any disclaimer, the term of this patent is extended or adjusted under 35 U.S.C. 154(b) by 334 days.

(21) Appl. No.: 16/088,433

(22) PCT Filed: Apr. 4, 2017

(86) PCT No.: PCT/IB2017/051913
§ 371 (c)(1),
(2) Date: Sep. 25, 2018

(87) PCT Pub. No.: WO2017/175128
PCT Pub. Date: Oct. 12, 2017

(65) Prior Publication Data
US 2019/0110634 A1    Apr. 18, 2019

(30) Foreign Application Priority Data

Apr. 4, 2016 (IT) .................. 102016000034379

(51) Int. Cl.
*A47J 31/44* (2006.01)
*A47J 31/46* (2006.01)

(52) U.S. Cl.
CPC .......... *A47J 31/4489* (2013.01); *A47J 31/46* (2013.01)

(58) Field of Classification Search
CPC ..... A47J 31/4489; A47J 31/4485; A47J 31/46
See application file for complete search history.

(56) References Cited

U.S. PATENT DOCUMENTS

| | | | | |
|---|---|---|---|---|
| 3,260,190 A * | 7/1966 | Levinson | ............ | A47J 31/0642 99/295 |
| 5,653,362 A * | 8/1997 | Patel | .................... | A47J 41/0011 222/156 |
| 6,293,187 B1 * | 9/2001 | Zils | ...................... | A47J 31/4482 99/293 |
| 6,708,600 B2 * | 3/2004 | Winkler | .............. | A47J 31/3695 99/295 |
| 6,749,331 B1 * | 6/2004 | Hughes | .................. | B01F 7/161 366/191 |
| 8,047,125 B2 * | 11/2011 | Bazin | .................. | A47J 31/4482 99/293 |
| 8,784,570 B2 * | 7/2014 | Morin | ................. | A47J 31/4489 134/22.12 |

(Continued)

FOREIGN PATENT DOCUMENTS

| | | |
|---|---|---|
| EP | 1092378 | 4/2001 |
| EP | 1491120 | 12/2004 |

(Continued)

*Primary Examiner* — Robert J Utama
*Assistant Examiner* — Lawrence H Samuels
(74) *Attorney, Agent, or Firm* — Themis Law

(57) ABSTRACT

A beverage dispensing machine provided with a cappuccino maker includes a heater, a jug provided with a lid having a hole, and a pipe, operated by an actuator, which moves the pipe perpendicularly with respect to the jug so that, during operation of the heater, the pipe emits steam into the jug, at the same time locking the jug inside its seat. The pipe is operated with a mechanism sliding upwards and downwards inside guides and is provided with a flexible connection piece for connection to the heater.

12 Claims, 8 Drawing Sheets

(56) References Cited

U.S. PATENT DOCUMENTS

| | | | |
|---|---|---|---|
| 9,003,957 B2* | 4/2015 | Pagano | A47J 31/4489 99/287 |
| 9,629,496 B2* | 4/2017 | Constantine | A23C 3/037 |
| 9,833,753 B2* | 12/2017 | Guo | B01F 7/32 |
| 10,470,431 B2* | 11/2019 | Adriaens | A01J 11/04 |
| 10,765,255 B2* | 9/2020 | Tonelli | A47J 31/4485 |
| 2003/0177914 A1* | 9/2003 | Schub | A47J 43/082 99/348 |
| 2004/0208081 A1* | 10/2004 | Hughes | B01F 7/161 366/191 |
| 2004/0237798 A1* | 12/2004 | Payne | A47J 27/04 99/348 |
| 2009/0056557 A1* | 3/2009 | Lin | A47J 31/02 99/323 |
| 2009/0301310 A1* | 12/2009 | Bazin | A47J 31/4482 99/290 |
| 2010/0003022 A1* | 1/2010 | Reyhanloo | A47J 31/54 392/465 |
| 2010/0237517 A1* | 9/2010 | Stahl | A47J 31/4489 261/77 |
| 2011/0017073 A1* | 1/2011 | Morin | A47J 31/60 99/290 |
| 2011/0030564 A1* | 2/2011 | Cocco | A47J 31/469 99/323.3 |
| 2011/0151060 A1* | 6/2011 | Nakagiri | A47J 31/0642 426/77 |
| 2012/0000372 A1* | 1/2012 | Vanni | A47J 31/4489 99/323.1 |
| 2012/0007260 A1* | 1/2012 | Lin | B01F 7/161 261/142 |
| 2012/0073449 A1* | 3/2012 | Volonte | A47J 31/4489 99/323.1 |
| 2012/0297989 A1* | 11/2012 | Tonelli | A47J 31/4485 99/293 |
| 2013/0101718 A1* | 4/2013 | Kindler | A47J 31/4485 426/474 |
| 2013/0145936 A1* | 6/2013 | Dollner | A47J 31/4489 99/293 |
| 2013/0152798 A1* | 6/2013 | Pagano | A47J 31/4489 99/287 |
| 2014/0208954 A1* | 7/2014 | Starr | A47J 31/0576 99/283 |
| 2016/0106257 A1* | 4/2016 | Ferraro | A47J 31/4407 99/293 |
| 2016/0270589 A1* | 9/2016 | Tonelli | A47J 31/4489 |
| 2016/0353918 A1* | 12/2016 | Talon | A47J 31/407 |
| 2017/0359996 A1* | 12/2017 | Adriaens | A47J 31/545 |
| 2018/0310753 A1* | 11/2018 | Wessels | B65D 85/8043 |
| 2018/0310754 A1* | 11/2018 | de Graaff | A47J 31/4489 |

FOREIGN PATENT DOCUMENTS

| | | |
|---|---|---|
| EP | 2036471 | 3/2009 |
| IT | 1236535 | 3/1993 |
| WO | 2013035120 | 3/2013 |

* cited by examiner

CAPPUCCINO MAKER

TECHNICAL FIELD OF THE INVENTION

The present invention relates to a cappuccino maker device for machines for dispensing beverages such as coffee and caffè americano or more generally beverages to be reconstituted. The machine may be designed with very small dimensions and is therefore particularly suitable for built-in coffee machines. In particular, the machine according to the invention, owing to its small dimensions, may be used on boats and yachts, where the space is restricted, as well as on aircraft and/or for domestic use.

PRIOR ART

In the nautical and naval sector a first pressing problem is that of the lack of space and consequently the beverage dispensing machines have particularly small dimensions and do not have parts projecting from their form. Also the problems arising from the continuous movement must not be overlooked. These types of devices, finally, must comply with the specific requirements of strict standards, A beverage dispensing machine is described in PCT/IT2011/000309.

A pod-holder device for beverage dispensing machines is described in WO2013/035120. In conventional beverage dispensing devices the cappuccino maker has an external spout which requires frequent cleaning since it comes into contact with milk and in combination with the heat also creates residues which are difficult to remove.

A different type of cappuccino maker is described in the document EP 2036471. The device described has a jug provided with a lid having an opening inside which the steam supply pipe is seated. The movement of the pipe is constrained to the lid with the opening since its terminal part must engage firmly and form a seal with the lid of the jug in order to allow steam to be produced. The device has a complex constructional design because the top part and the bottom part must be perfectly aligned since otherwise the steam is not produced correctly.

To the inventors' knowledge, beverage dispensing machines comprising a cappuccino maker with the characteristics of the cappuccino maker according to the present invention are not known. The cappuccino maker according to the invention solves the technical problem posed by conventional cappuccino makers which is that of the difficulty of cleaning them and their complex constructional design.

SUMMARY OF THE INVENTION

The present invention relates to a beverage dispensing machine which comprises a device called a cappuccino maker which solves the problems of the prior art.

The cappuccino maker comprises a steam tube or pipe which connects a heater with a container for liquids to be heated, which advantageously may be milk. The steam tube or pipe is operated by means of a lever located on the front part of the machine and extends down through the centering hole formed in the closing lid of the container which contains the milk or other liquid to be heated.

Other objects will become clear from the detailed description of the invention below.

BRIEF DESCRIPTION OF THE FIGURES

For a better understanding of the invention, the attached figures show a non-limiting example of said invention, i.e. the cappuccino maker device of the invention, wherein.

DETAILED DESCRIPTION OF THE INVENTION

Figure 1:
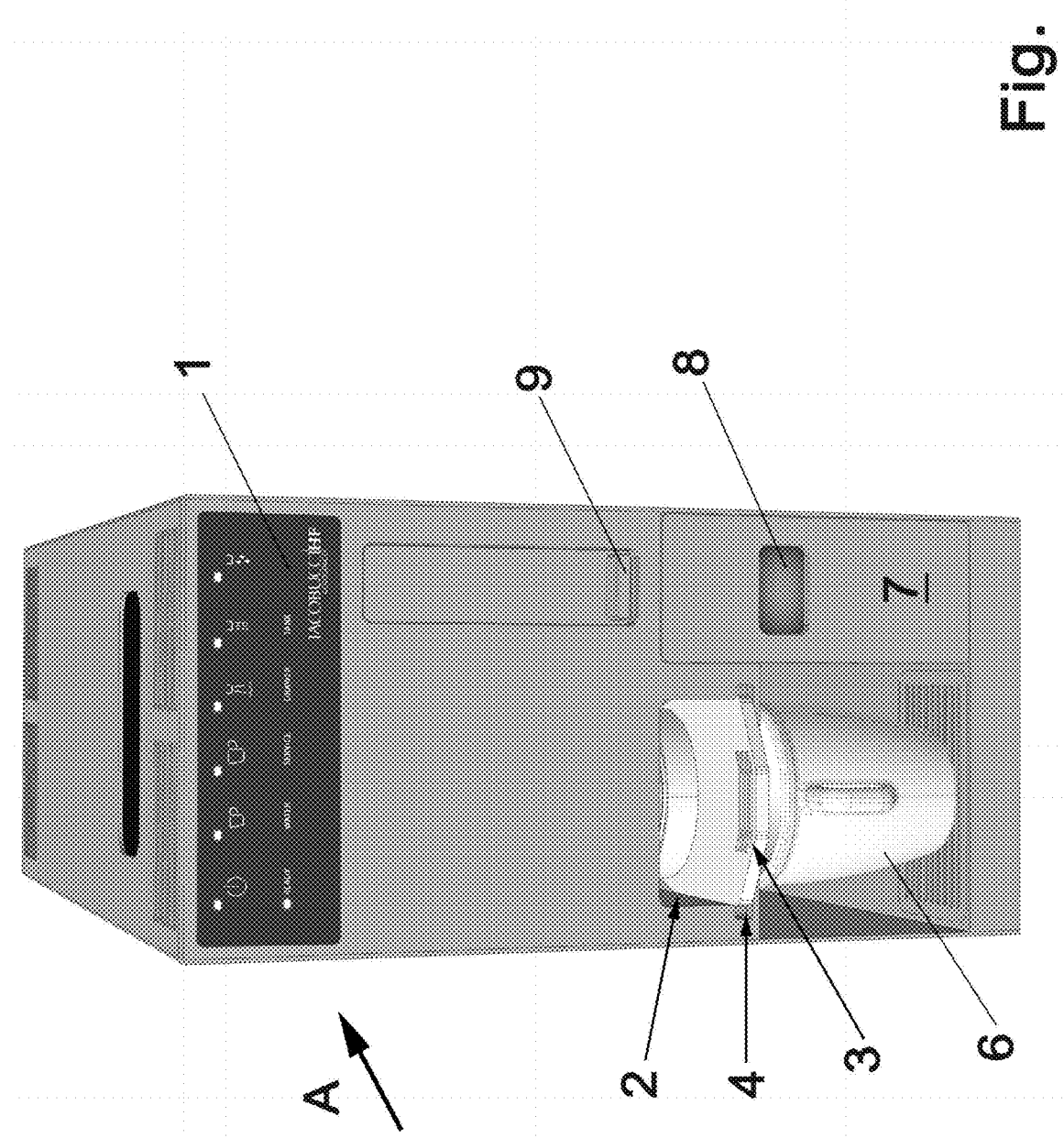
FIG. 1 shows in schematic form a front view of a beverage dispensing machine provided with a cappuccino maker.
Figure 2:
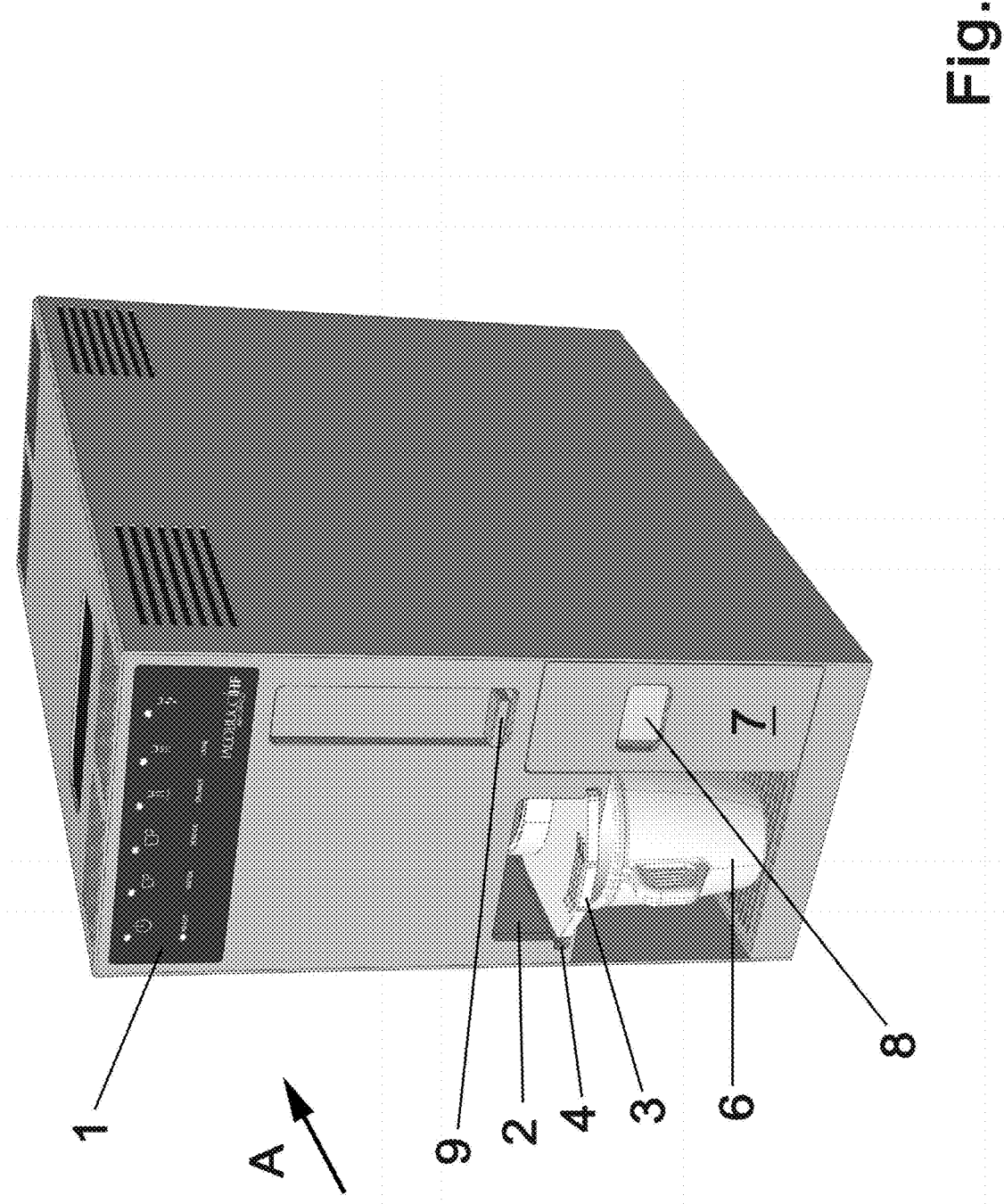
FIG. 2 shows a schematic perspective view of the machine and cappuccino maker assembly.
Figure 3:
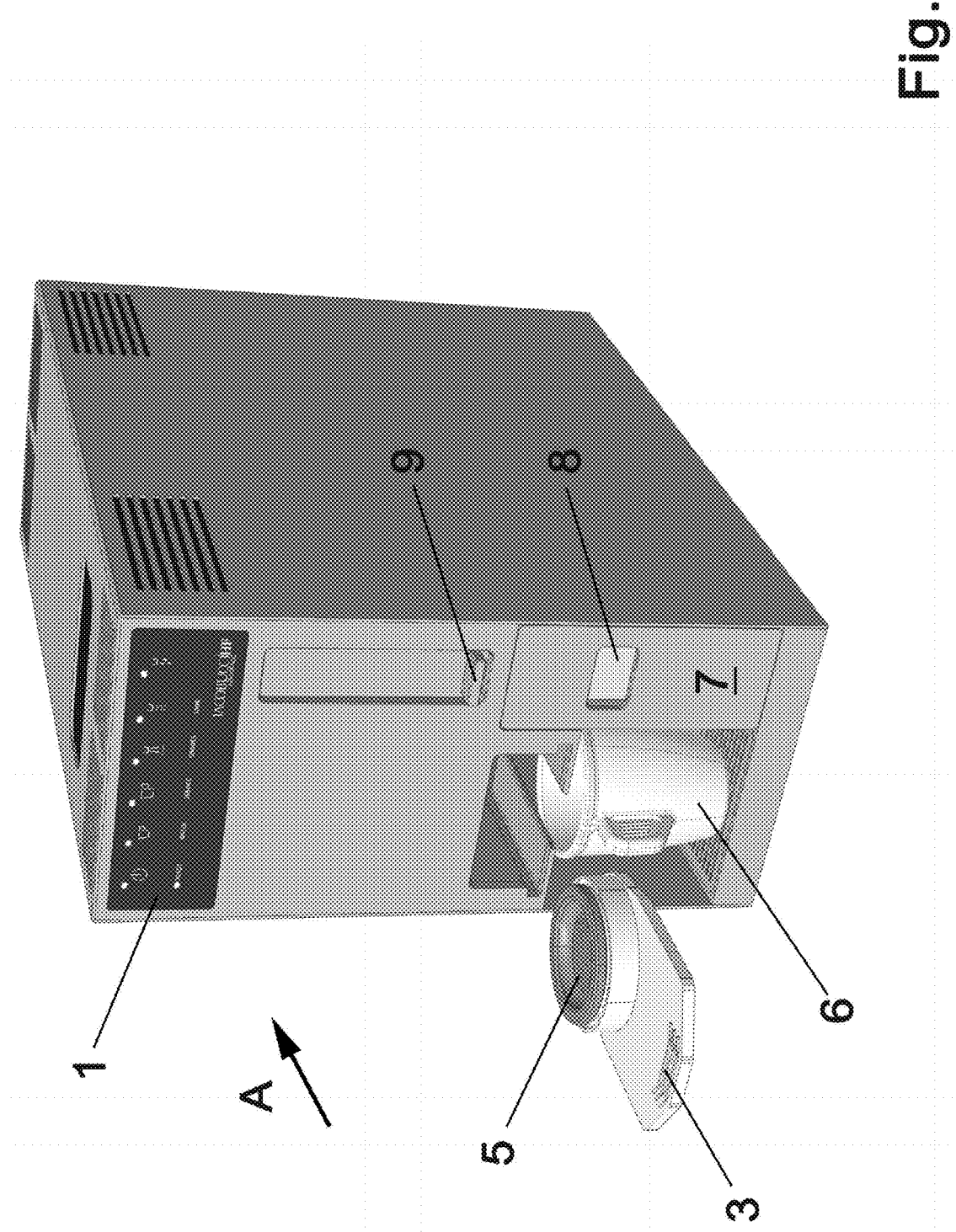
FIG. 3 shows a schematic perspective view of the machine according to FIG. 1 with the drawer 3 of the pod holder partially extracted.
Figure 4:
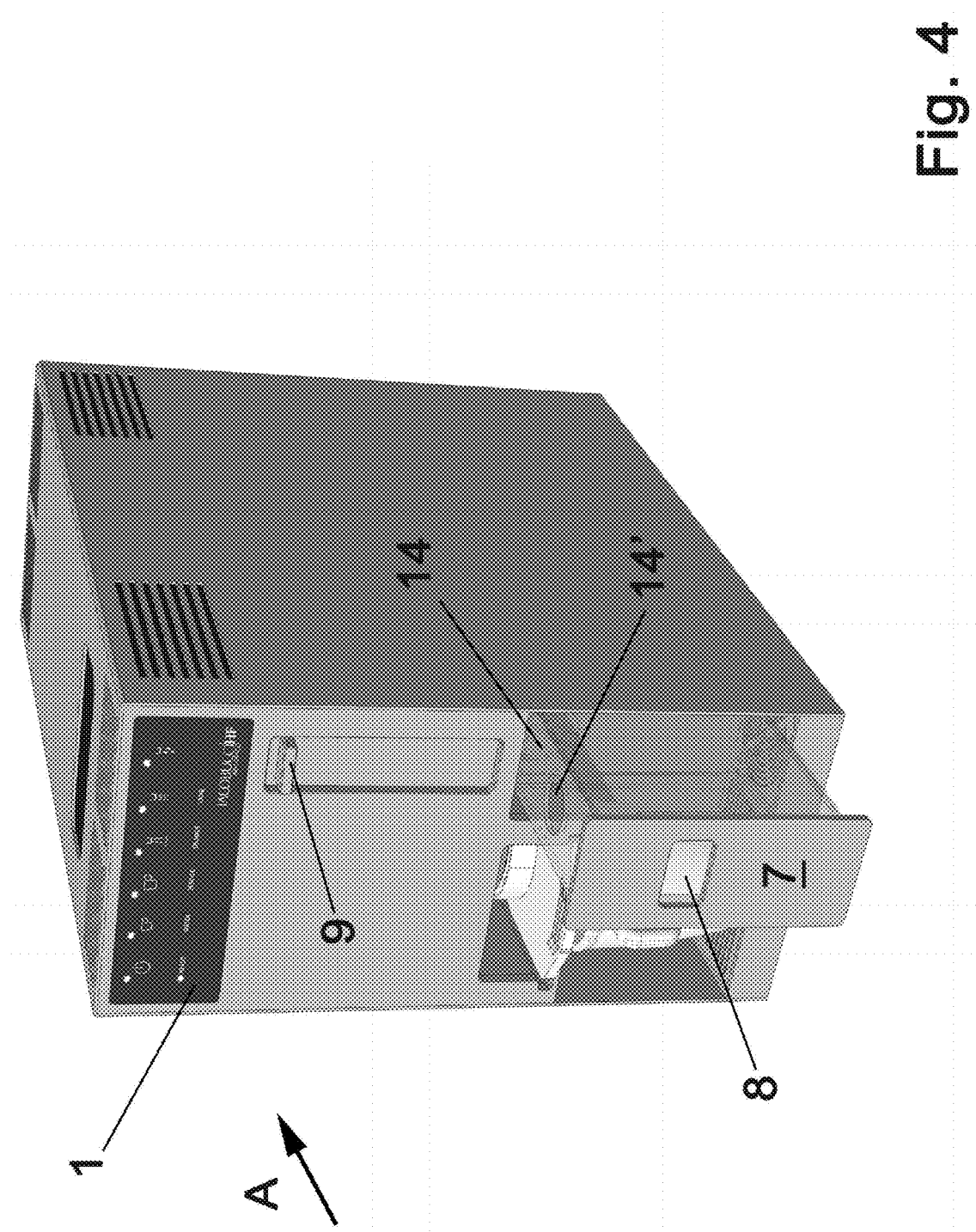
FIG. 4 shows a schematic perspective view of the machine according to FIG. 1 with the jug 7 partially extracted.
Figure 5:
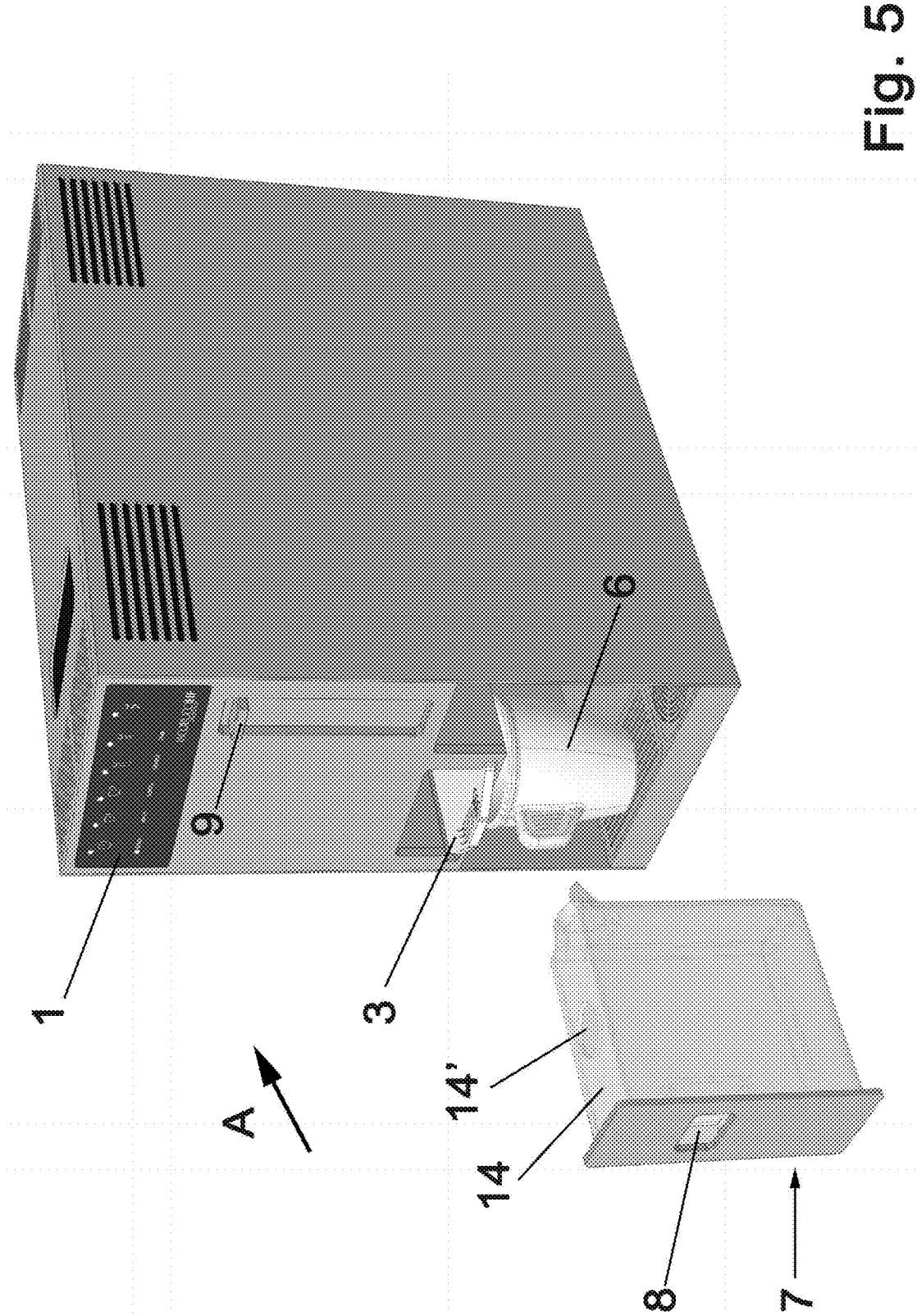
FIG. 5 shows a schematic perspective view of the machine according to FIG. 1 with the jug 7 completely extracted.
Figure 6:
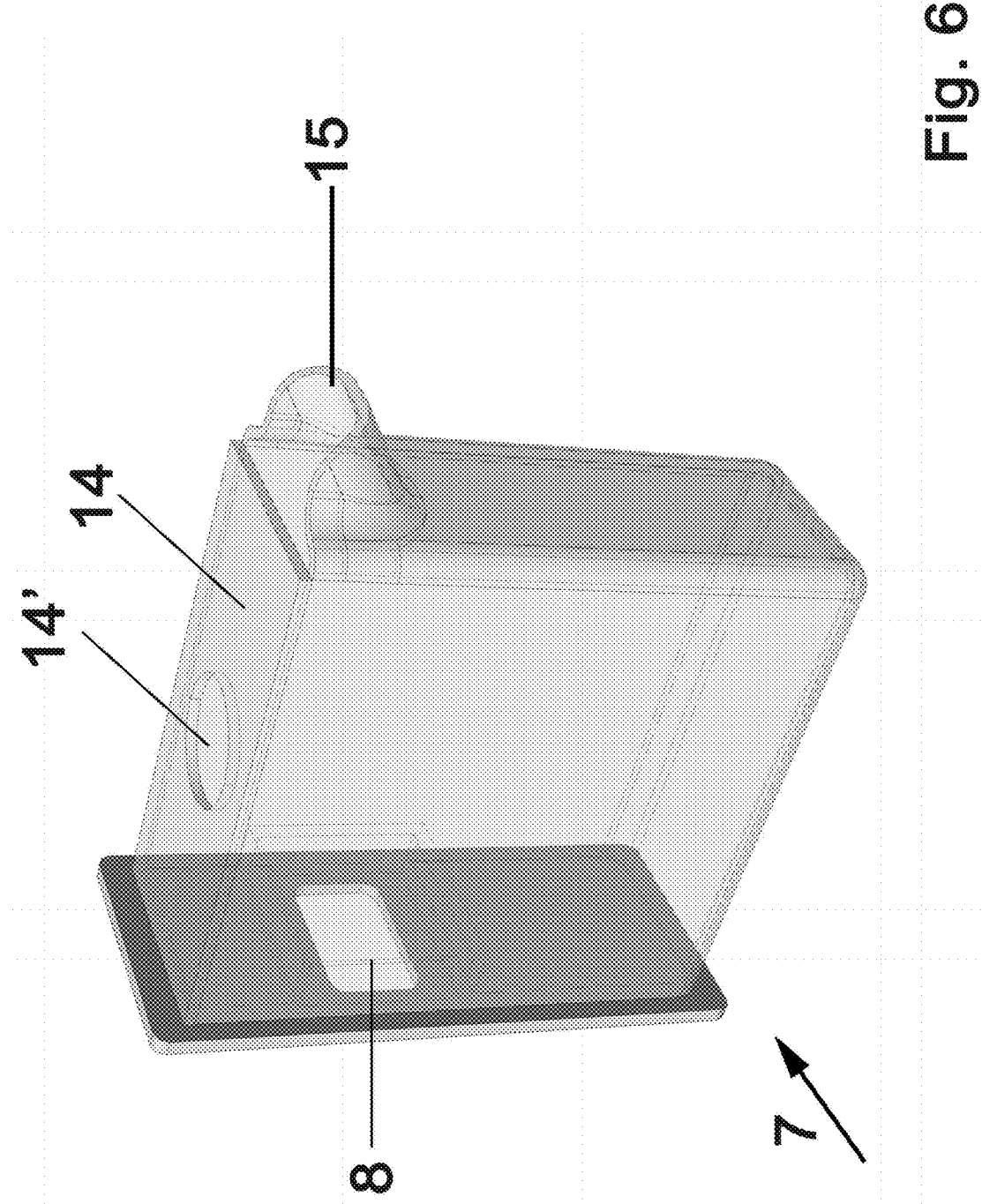
FIG. 6 shows a schematic perspective view of the jug 7 extracted from the machine of FIG. 1.

The invention relates to a machine which, in addition to being able to dispense hot beverages such as coffee, caffè lungo, tea and/or hot water through a pod-holder device, is provided with a so-called cappuccino maker device, in accordance with the accompanying claims. In particular, the machine comprises a substantially aluminium supporting structure, side panels, a base and a top piece made substantially of aluminium, said machine being characterized in that it comprises parts configured and shaped as described in the accompanying claims, so as to be used in particularly confined spaces such as those on-board vessels such as yachts and boats, aircraft and/or in kitchens having very small dimensions and where there is little available space.

The machine according to the invention is designed to prepare hot beverages such as coffee, caffè lungo and tea in predetermined quantities by means of a pod-holder device, for example of the type known per se, and also supply hot water and/or steam inside a container for liquids, which advantageously may contain milk.

For the preparation of hot beverages it is envisaged using pre-packaged single-dose capsules, typically in the form of pods, which contain the ingredient to be brought into contact with water, such as coffee powder. Particularly advantageous are pods of the type known for automatic devices, in which each pod consists of a single dose—which may be pre-compressed—of coffee powder, tea, cocoa, milk or the like, which allows a beverage to be produced by means of water passing through the pod. Advantageously, the coffee machine according to the invention may be provided with one or more heaters, positioned above the pod-holder element for the production of both hot water and steam. In an alternative embodiment an additional exchanger designed to produce steam may be provided. In this case, only the inlet section is in common with the rest of the machine, while the piping, pump and valves are specific to this section of the machine.

The water supply pipes are preferably made of flexible plastic, such as food-grade Teflon®, while the fittings are made of material which does not have harmful effects.

In the description below the terms "exchanger" and "heater" are to be regarded as synonyms and both terms indicate heating systems, known per se, designed for the production of hot water and/or steam.

The cappuccino maker device and the machine may be provided with one or more heaters.

The cappuccino maker device according to the invention comprises a jug provided with a lid having a hole and a heater, these being connected together by means of a pipe or tube for supplying the steam (also called steam tube or pipe) which engages inside the hole in the lid of the jug. Advantageously, the steam tube or pipe is entirely or partly of the disposable type, so that it may be replaced after use and with advantages from the hygiene point of view. The tube is moved on the jug by means of a guide mechanism of the upward/downward moving type operated for example manually by a lever or electrically or in some other way, known per se, which allows the steam tube or pipe to be raised and lowered on the jug, allowing the dual function of fixing the jug in position and supplying steam to be performed. The upward/downward movement is advantageously assisted by guides. The tube or pipe, which is advantageously made of flexible material, slides freely through the hole in the jug without constraints or seals and is therefore easy to manufacture, maintain and clean. The pipe may be associated with or replaced by a milk-frothing device such as a whisk. The milk-frothing device may be formed simply as an end-piece which fits onto the pipe, or may be a device, separate from the pipe, which is moved upwards and downwards and may not be connected to the heater.

In detail the operating principle of the steam tube or pipe is as follows. By operating a lever or other control device arranged on the front of the machine, the pipe and/or the whisk are made to move upwards and downwards inside the centering hole created in the closing lid of the milk container. The pipe and/or the whisk may be locked in all the intermediate positions between the start and the end of their travel movement so that the system is not dependent on the presence of predetermined amounts of liquid to be heated/frothed inside the jug.

The dispensing operation and/or the milk-frothing action of the whisk and/or of the steam is/are activated when the steam tube or pipe and/or the whisk reach(es) the correct position with respect to the jug, these functions being maintained for the time required by the user. It is possible to perform activation of the steam and/or of the whisk by means of the enabling command from a microswitch or other system known per se, associated with the presence of the jug in its seat, using known arrangements within the scope of the person skilled in the art.

Once the aforementioned functions have been terminated, upon raising of the lever or other control device the pipe and/or whisk return into their initial rest position. Depending on the height of the machine in which the cappuccino maker is installed, the pipe and/or the whisk may be provided with an articulated system allowing them to be arranged in a horizontal position. Alternatively, a telescopic or flexible system may be provided. All the part of the pipe and/or whisk may be made of disposable food-grade plastic material which may be rigid, flexible and combinations thereof.

Owing to its essential form, the external design of the machine is completely different from that of the other machines which are currently produced for civil use. There are no levers or other external projecting operating systems which could create dangerous situations. The control devices are located on a front control panel of the touch sensor type with indicator lamps and silk-screen printed indicators.

Management of the main functions of the machine is performed by an electronic section controlled by a microprocessor and software.

The invention will now be illustrated with reference to the accompanying figures to be regarded as examples not limiting the scope of the invention.

DESCRIPTION OF A PREFERRED EMBODIMENT OF THE INVENTION

With particular reference to the accompanying figures, the machine A according to the invention is provided with a control panel 1 of the touch-sensitive type, and a pod-holder compartment 2 with associated drawer 3 sliding inside its own sliding seat 4. The drawer 3 can be extracted fully in order to facilitate positioning of the pods (not shown) inside the pod-holder seat 5. The drawer 3 and the pod-holder seat 5 are situated opposite a cup 6, which may be a coffee cup, tea cup or cup for cappuccino. In the embodiment shown in the figures the cappuccino maker device is positioned to one side of the drawer 3 and the cup 6. It comprises a container for the liquid to be frothed, which for all intents and purposes is a jug 7, provided with a pouring spout 15, perforated lid or cover 14 provided with a hole 14' and recess 8 for manual extraction from the machine. The jug 7 has, arranged above it, the mechanism for raising the steam tube or pipe 10, shown in FIGS. 7 and 8. The raising mechanism is operated by the lever actuator 9 with a mechanism sliding upwards or downwards inside guides 11 (shown in FIGS. 7 and 8) and with the possibility of stopping the movement in all the intermediate positions of the upward/downward movement and the tube 10.

Figure 7:
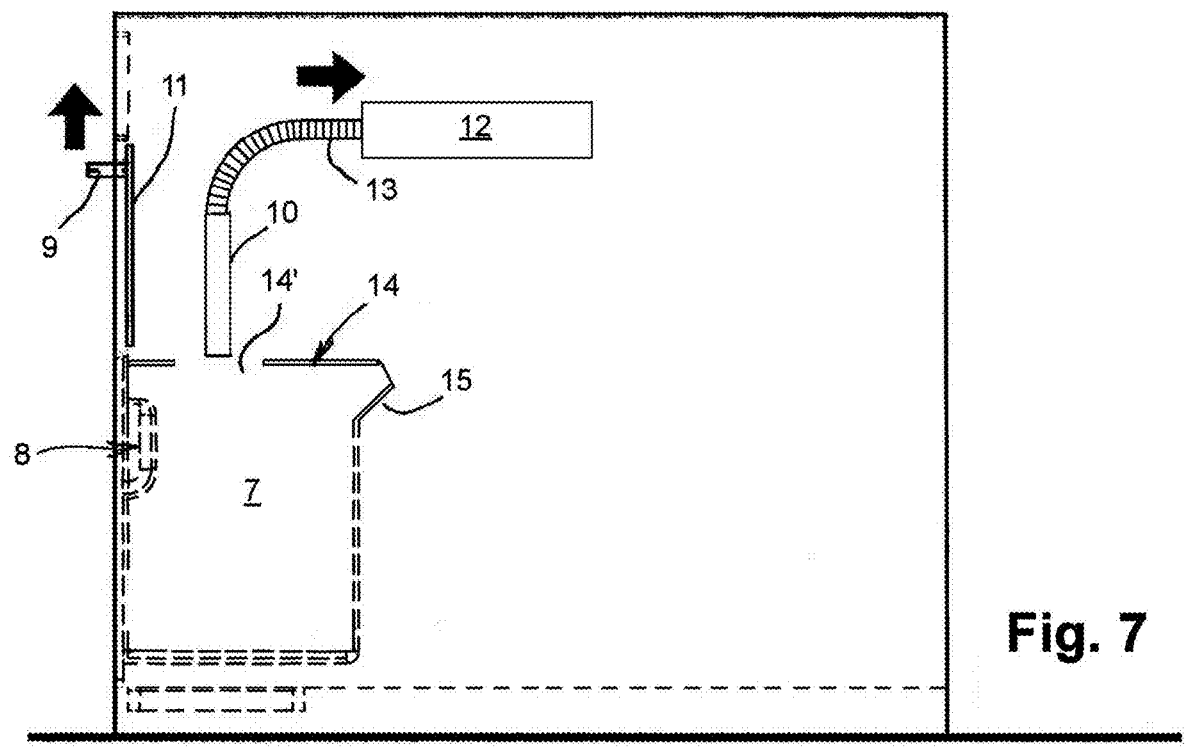
FIG. 7 shows in schematic view a laterally sectioned view of the cappuccino maker device according to the invention with the pipe 10 above the jug 7.
Figure 8:
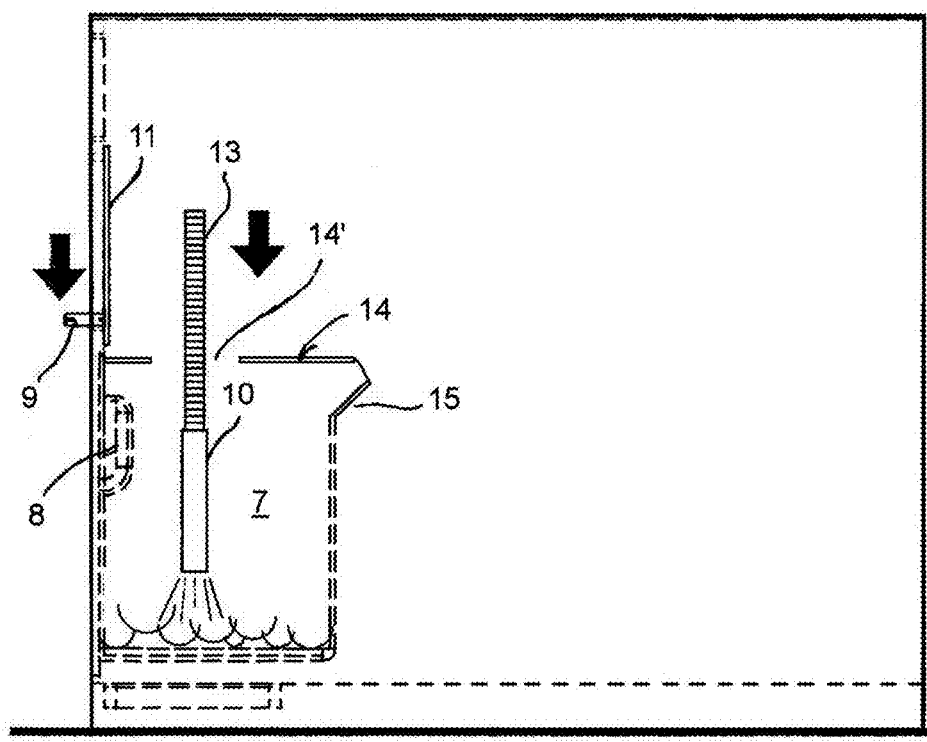
FIG. 8 shows in schematic view a laterally sectioned view of the cappuccino maker device according to the invention with the pipe 10 inserted in the lid 14 of the jug 7.

FIGS. 7 and 8 show in schematic form the steam tube or pipe 10 provided with a flexible connection piece 13 for connection to the heater 12. Also visible are the jug 7 with gripping recess 8, the spout 15 and the lid 14 provided with centering hole 14'.

Figure 9:
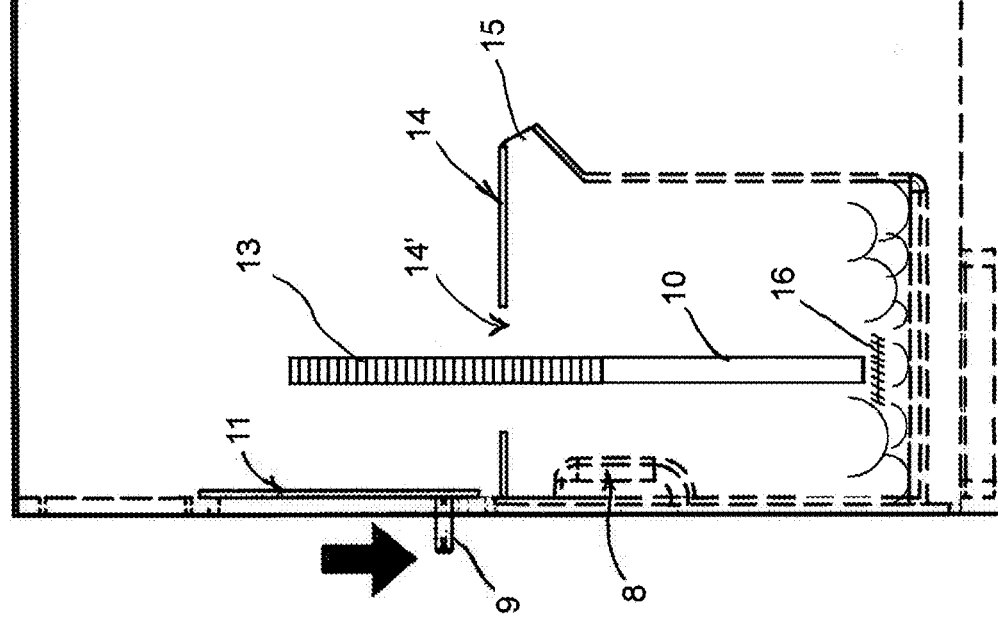
FIG. 9 is the same view as FIG. 8 in which the pipe 10 has a milk-frothing whisk 16 mounted on its end part.

With reference to FIG. 9 this shows in schematic form the steam tube or pipe 10 provided at its end with a milk-frothing whisk 16 or similar device for frothing the milk which may be optionally provided in addition to or instead of the pipe 10. The tube 10 can be extracted from its seat and replaced entirely or partly in order to facilitate the cleaning operations; moreover it may be freely slidable inside the hole 14' without the need for sealing or parts which ensure sealing with the lid 14 or prevent operation of the system in the absence of said seal. The pipe 10 is inserted inside the jug without the need for a proper sealing device. Obviously, however, it has a securing action for the jug, while not immobilizing it entirely. The end part (spout) of the pipe which comes into contact with the liquid present in the jug may be advantageously provided with a Venturi device for generating the steam. The pipe (10), which is an actual vaporizer, is made of plastic and is replaceable so as to ensure better hygiene and food safety properties of the system, also with regard to the end user.

In order to operate the cappuccino maker the steam tube or pipe 10 is lowered by operating the lever actuator 9 which slides downwards inside the guides 11 so that the tube 10 is inserted inside the centering hole 14', locking the jug 7 in position so as to prevent accidental extraction from its seat inside the machine during operation. Advantageously the steam tube or pipe 10 is substantially rigid so as to prevent extraction of the jug during dispensing of the steam and is moved along its vertical travel path with the aid of the flexible connection piece 13 so as to be inserted perpendicularly or at an angle inside the centring hole 14'. The exchanger 12 is controllably activated so as to dispense steam when the steam tube or pipe 10 reaches the correct position with respect to the jug 7 and the steam dispensing function is maintained for the time desired by the user.

Once operation has been completed, the lever 9 is raised so that the steam tube or pipe 10 returns into its initial rest position.

The functions described above may be carried out by replacing the tube 10 with or adding to it a milk-frothing device 16.

The figures are provided merely by way of illustration and a person skilled in the art may make variations or modifications which do not depart from the spirit or scope of the invention. It is understood that these variations and modifications are included within the subject-matter of the description, the drawings and the claims.

The invention claimed is:

1. A cappuccino maker device comprising:
   a housing having an opening therein, the opening providing access for an exterior environment to an interior of the housing;
   a heater disposed inside the housing;
   a jug provided with lid having a hole therein, the jug being configured to removably engage the opening so as to receive steam in the interior of the housing and to face the exterior environment with a lateral wall that is flush with an exterior wall of the housing, the lateral wall having a recess defined therein for removing the jug from the housing; and
   a pipe, operated by an actuator which moves the pipe with respect to the jug, so that during operation of the heater the pipe introduces steam into the jug, said pipe being freely slidable inside the hole.

2. The cappuccino maker device according to claim 1, wherein the pipe is operated with a mechanism sliding upwards and downwards inside guides.

3. The cappuccino maker device according to claim 1, wherein the pipe is provided with a flexible connection piece for connection to the heater, the flexible connection piece being directly attached to the pipe and being bendable so as to enable an upward movement of the pipe away from the jug and a downward movement of the pipe into the hole of the jug.

4. The cappuccino maker device according to claim 1, wherein the pipe is combined with a milk-frothing device.

5. The cappuccino maker device according to claim 1, wherein the milk-frothing device is formed as an end-piece which fits onto the pipe.

6. The cappuccino maker device according to claim 4, wherein the cappuccino maker device comprises more than one heater.

7. A beverage dispensing machine comprising:
   a cappuccino maker device having,
   a housing having an opening therein, the opening providing access for an exterior environment to an interior of the housing;
   a heater-disposed inside the housing;
   a jug provided with lid having a hole therein, the jug being configured to removably engage the opening so as to receive steam in the interior of the housing and to face the exterior environment with a lateral wall that is flush with an exterior wall of the housing, the lateral wall having a recess defined therein for removing the jug from the housing; and
   a pipe, operated by an actuator which moves the pipe with respect to the jug, so that during operation of the heater the pipe introduces steam into the jug, said pipe being freely slidable inside the hole.

8. The beverage dispensing machine according to claim 7, further comprising a pod-holder compartment provided with grooves for a sliding movement of a drawer.

9. The beverage dispensing machine according to claim 7, further comprising a touch-sensitive control panel.

10. The beverage dispensing machine according to claim 7, wherein the beverage dispensing machine comprises more than one heater.

11. A method of use of a cappuccino maker device comprising:
    providing a cappuccino maker device according to claim 1;
    disposing the cappuccino maker device in a beverage dispensing machine adapted for use in an aeronautical or naval machine or in a home.

12. A cappuccino maker device comprising:
    a housing having an opening therein, the opening providing access for an exterior environment to an interior of the housing;
    a heater disposed inside the housing;
    a jug provided with lid having a hole therein, the jug being configured to removably engage the opening so as to receive steam in the interior of the housing and to face the exterior environment with a lateral wall that is flush with an exterior wall of the housing, the lateral wall having a recess defined therein for removing the jug from the housing; and
    a milk-frothing device, operated by an actuator which moves the milk-frothing device with respect to the jug, said milk-frothing being freely slidable inside the hole.

* * * * *